United States Patent [19]

Ogale

[11] Patent Number: 5,318,842

[45] Date of Patent: Jun. 7, 1994

[54] BIAXIALLY ORIENTED PROPYLENE POLYMER FILM OR SHEET ARTICLES

[75] Inventor: Kumar Ogale, New Castle County, Del.

[73] Assignee: Himont Incorporated, Wilmington, Del.

[21] Appl. No.: 984,743

[22] Filed: Dec. 3, 1992

[51] Int. Cl.$^5$ .............................................. B32B 7/12
[52] U.S. Cl. .................................. 428/349; 428/516; 428/910; 525/240
[58] Field of Search ................. 428/349, 516, 910; 525/240

[56] References Cited

U.S. PATENT DOCUMENTS

| | | | |
|---|---|---|---|
| 4,514,534 | 4/1985 | DiNardo | 524/108 |
| 4,677,025 | 6/1985 | Davidson et al. | 428/349 |
| 4,950,720 | 8/1990 | Randall, Jr. et al. | 525/322 |
| 5,011,719 | 4/1991 | Gehrke et al. | 428/35.7 |
| 5,030,506 | 7/1991 | Yamawaki et al. | 428/216 |
| 5,093,415 | 3/1992 | Brady, III et al. | 525/53 |
| 5,212,246 | 5/1993 | Ogale | 525/240 |

*Primary Examiner*—Edith Buffalow

[57] ABSTRACT

Disclosed are biaxially oriented film or sheet articles comprising:

(a) a base or inner layer of a film or sheet of a crystalline homopolymer of a $C_{3-10}$ alpha-olefin monomer or of a certain propylene copolymers; and (b) at least one surface layer of a broad molecular weight distribution propylene polymer material, optionally containing a propylene homopolymer having an isotactic index greater than 80, or certain propylene copolymers.

13 Claims, No Drawings

BIAXIALLY ORIENTED PROPYLENE POLYMER FILM OR SHEET ARTICLES

FIELD OF THE INVENTION

This invention relates to biaxially oriented thermoplastic films, sheets and laminates formed containing at least one surface layer of a film or sheet of high molecular weight distribution propylene polymer material alone or blended with other olefin polymer materials.

BACKGROUND OF THE INVENTION

In many film application, such as packaging of foodstuffs, chemical and hazardous materials and in medical applications, the industry requires films having certain properties. In the packaging of foodstuffs, for example, the films must have high puncture resistance, high clarity and gloss, and reduce permeability to gases and/or vapors. The films used to manufacture containers for chemicals and hazardous waste materials must have high puncture resistance, high elongation strength, high tear resistance and chemical resistance. Films used in medical applications, such as blood bags, must have a high puncture resistance, low modulus, high tear resistance and auto clavability.

Polypropylene provides a combination of desirable properties, such as tolerance of high temperature, retardation, or prevention, of moisture vapor transmission and approval for contact with food and medical solutions. Thus, polypropylene has been widely used in film and sheets for packaging of foodstuffs, chemical and hazardous materials and medical applications. However, polypropylene does suffer from relatively poor brittleness, low impact strength and clarity.

Attempts have been to overcome the shortcomings of polypropylene in films and sheets by modifying the polypropylene itself or by coextruding the polypropylene with other polyolefin type resins. For example, U.S. Pat. No. 4,514,534 discloses a modified polypropylene comprising low molecular weight polypropylene, a peroxide, a nucleating agent and linear low density polyethylene for biaxially oriented films to improve clarity.

U.S. Pat. No. 4,950,720 discloses modified polypropylene comprising a reactor blend of a high molecular weight propylene/olefin random copolymer with a lower molecular weight substantially isotactic propylene homopolymer. The reference teaches that the modified polypropylene having a molecular weight distribution of from about 5 to about 10 can be extruded or coextruded for use in film applications.

In U.S. Pat. No. 5,011,719 are disclosed multilayer films comprising at least two layers of modified polypropylene-based compositions comprising a blend of a propylene-ethylene copolymer, an ethylene-butene copolymer and optionally an elastomer in either or both layers.

SUMMARY OF THE INVENTION

The present invention overcomes substantially many of the short comings of the films and sheets of the prior art by providing films or sheets comprising a film or sheet of a propylene polymer material having a broad molecular weight distribution alone, or blended with other or different polyolefin type materials. It has been found that the stiffness and moisture vapor transmission properties of films or sheets of conventional film grade polyolefin type resins, particularly polypropylene, can be improved by adding at least one film or sheet layer comprising a propylene polymer material having a broad molecular weight distribution.

Accordingly, this invention provides a biaxially oriented film or sheet having the desired properties comprising:

(a) a base or inner layer of a crystalline homopolymer of a $C_{3-10}$ alpha-olefin monomer or of a copolymer selected from the group consisting of (i) propylene with an olefin selected from the group consisting of ethylene and $C_{4-10}$ alpha-olefins, and (ii) propylene with ethylene and a $C_{4-10}$ alpha-olefin monomer; and (b) at least one surface layer of a broad molecular weight distribution (BMWD) propylene polymer material, optionally containing from 90 to 30% by weight of a propylene homopolymer having an isotactic index greater than 80, or a copolymer selected from the group consisting of (i) propylene and ethylene, (ii) propylene and a $C_{4-10}$ alpha-olefin, (iii) propylene, ethylene and a $C_{4-10}$ alpha-olefin, and (iv) a blend of (i) and (ii), said copolymer containing over 80% propylene and having an isotactic index greater than 80.

The films or sheets of the present invention may be constructed so that the film or sheet of component (a) is a base layer having on either surface thereof a film or sheet layer of component (b) containing a BMWD propylene polymer material.

In another embodiment, the films or sheets of the present invention may be constructed so that the film or sheet of component (a) is an inner layer between two film or sheet layers of component (b) containing a BMWD propylene polymer material.

DETAILED DESCRIPTION OF THE INVENTION

Preferably, component (a) is a film or sheet of (i) a homopolymer of propylene, or butene-1; (ii) a random copolymer of propylene and an olefin selected from the group consisting of ethylene and $C_4$–$C_{10}$ alpha-olefins, provided that, when the olefin is ethylene, the maximum polymerized ethylene content is about 10%, preferably about 4%, and when the olefin is a $C_4$–$C_{10}$ alpha-olefin, the maximum polymerized content thereof is about 20%, preferably about 16%; or (iii) a random terpolymer of propylene and two different olefins selected from the group consisting of ethylene and $C_4$–$C_8$ alpha-olefins, provided that the maximum polymerized $C_4$–$C_8$ alpha-olefin content is about 20%, preferably about 16%, and, when ethylene is one of the olefins, the maximum polymerized ethylene content is about 5%, preferably about 4%, with a maximum comonomer content of 25%.

The propylene polymer material, component (b), having a broad molecular weight distribution can be a homopolymer of propylene or copolymers of propylene with ethylene, $C_{4-8}$ alpha-olefins or mixtures thereof in quanties preferably ranging from 0.5 to 6% by weight, most preferably from 2 to 6% by weight with respect to the total copolymer. Said propylene polymer has a having a broad MWD, Mw/Mn, measured by gel permeation chromatography, of from 10 to 60, preferably from 12 to 40, a melt flow rate of from 0.5 to 50, preferably from 3 to 30, and a xylene insolubles at 25° C. of greater than or equal to 94%, and preferably greater than or equal to 96%.

Said BMWD propylene polymer material can be blended with a propylene homopolymer having an isotactic index greater than 80, preferably greater than 90; or a copolymer selected from the group consisting of (i) a random copolymer of propylene and ethylene, having a maximum polymerized ethylene content of about 10%, and preferably about 4%; (ii) a random copolymer of propylene and a $C_{4\text{-}10}$ alpha-olefin, preferably butene-1, having a maximum polymerized alpha-olefin content of about 20%, preferably about 16%; (iii) a random terpolymer of propylene and two different olefins selected from the group consisting of ethylene and $C_{4\text{-}8}$ alpha-olefins, provided that the maximum polymerized $C_{4\text{-}8}$ alpha-olefin content is about 20%, preferably about 16%, and when ethylene is one of the olefins, the maximum polymerized ethylene content is about 5%, preferably about 4%, with a maximum comonomer content of 25%; and (iv) a blend of from 30 to 65%, preferably from 45 to 65% of the copolymer as defined in (ii), which contains from 80 to 98% propylene, and preferably from 85 to 95%, with from 35 to 70%, preferably from 35 to 55% of the copolymer defined in (i) which contains from 7 to 9% ethylene, or of the terpolymer defined in (iii) having a total comonomer content, i.e. of ethylene and a $C_{4\text{-}8}$ alpha-olefin, of from 2 to 10%, preferably from 2 to 6%, and the ethylene content is preferably from 1 to 3%.

Suitable $C_{4\text{-}10}$ alpha-olefins include linear or branched $C_{4\text{-}10}$ alpha-olefins such as, butene-1, pentene-1, 3-methylpentane-1, 4-methylpentene-1, hexene-1, 3,4-dimethylbutene-1, heptene-1, 3-methyl-1-hexene, and octene-1.

When component (b) is a blend of the BMWD propylene polymer material and the propylene homopolymer or copolymer described above, the BMWD propylene polymer material can be present in an amount of from 10 to 70%, preferably from 10 to 50% by weight of the total blend.

The broad molecular weight distribution propylene polymer material described above and used in the present invention, can be prepared by polymerization processes based on the use of particular Ziegler-Natta catalysts.

Preferably, said catalyst contain, as an essential element, a solid catalyst component (a) comprising a titanium compound having at least one titanium-halogen bond, and an electron donor compound both supported on a magnesium halide in active form, and are characterized in that they are capable of producing propylene polymers having a xylene insolubles fraction at 25° C. greater than or equal 94%, preferably greater than or equal to 96%, and have a sensitivity to molecular weight regulators (particularly hydrogen), high enough to produce propylene homopolymer having a Melt Index, (MIL), as determined according ASTM D 1238, of less than or equal to 0.5 and greater than or equal to 50 g/10 min. The catalyst used to prepared the broad molecular weight distribution propylene polymer material used in this invention, therefore, are obtained by contacting:

(a) the above mentioned solid catalyst component;
(b) an Al-Alkyl compound;
(c) an external electron-donor compound.

Solid catalyst components (a) having the above mentioned characteristics are well known in patent literature.

Particularly suited are the solid catalyst components used in the catalysts described in U.S. Pat. No. 4,339,054, and EP 45,977. Other examples are set forth in U.S. Pat. No. 4,472,524.

In general, the solid catalyst components used in said catalysts comprise, as electron-donor compounds, compounds selected from the ethers, ketones, lactones, compounds containing N, P, and/or S atoms, and esters of mono- and dicarboxylic acids.

Particularly suited are the esters of phthalic acid, such as diisobutyl, dioctyl and diphenyl phthalate, and benzylbutyl phthalate; the esters of malonic acid such as diisobutyl and diethyl malonate; the alkyl and aryl pivalates, the alkyl, cycloalkyl and aryl maleates, alkyl and aryl carbonates such as diisobutyl carbonate, ethyl phenyl carbonate, and diphenyl carbonate; the esters of succinic acid such as mono and diethyl succinate.

The preparation of the above mentioned catalysts is carried out according to various methods.

For example, the magnesium halide (anhydrous, i.e., containing less than 1% of water), the titanium compound, and the electron-donor compound can be milled under conditions where the magnesium halide is active. The milled product is then treated one or more times with an excess of $TiCl_4$ at temperatures from 80° to 135° C., after which it is washed repeatedly with a hydrocarbon (hexane, for example) until all the chlorine ions have disappeared.

According to another method, the anhydrous magnesium halide is preactivated according to known methods, and then caused to react with an excess of $TiCl_4$ containing the electron donor compound in solution. Here again the operation takes place at temperatures ranging from 80° C. and 135° C. Optionally, the treatment with $TiCl_4$ is repeated, and the solid washed with hexane, or another hydrocarbon solvent, in order to eliminate all traces of nonreacted $TiCl_4$.

According to another method, a $MgCl_2.nROH$ adduct (in particular under the form of spheroidal particles), where n is generally comprise from 1 and 3, and ROH is ethanol, butanol, or isobutanol, is caused to react with an excess of $TiCl_4$ containing the electron-donor compound in solution. The temperature generally ranges from 80° C. to 120° C. The solid is then isolated and caused to react once more with the $TiCl_4$, after which it is separated and washed with a hydrocarbon until all chlorine ions have disappeared.

According to another method, magnesium alcoholates and chloroalcoholates (particularly the chloroalcoholates prepared according to the method described in U.S. Pat. No. 4,220,554) are caused to react with an excess of $TiCl_4$ containing the electron-donor compound in solution, operating under the reaction conditions already described.

In the solid catalyst component (a), the titanium compound expressed as Ti is generally present in a percentage ranging from 0.5 to 10% by weight. The quantity of electron donor compound which remains fixed on the solid component (internal donor), generally ranges from 5 to 20% in moles with respect to the magnesium dihalide.

The titanium compounds which can be used for the preparation of the solid catalyst component (a) are the halides and the halogen alcoholates. Titanium tetrachloride is the preferred compound.

Satisfactory results can be obtained also with titanium trihalides, particularly $TiCl_3OR$ where R is a phenyl radical.

The reactions indicated above bring to the formation of magnesium halide in active form. Besides these reactions, other reactions are known in the literature which cause the formation of activated magnesium halide starting from magnesium compounds different from the halides, such as carboxylates of magnesium, for example.

The active form of the magnesium halides in the catalyst components (a) can be recognized by the fact that in the X-ray spectrum of the catalyst component the major intensity reflection, which appears on the spectrum of the nonactivated magnesium chloride (having a surface area smaller than 3 m²/g) is no longer present, but in its place there is a halo with the maximum intensity shifted with respect to the position of the major intensity reflection of the nonactivated magnesium dihalide, or by the fact that the major intensity reflection shows a width at half-height at least 30% greater than the one of the major intensity reflection which appears in the nonactivated Mg chloride spectrum.

The most active forms are those where the above mentioned halo appears in the X-ray spectrum of the component.

Among the magnesium halides, the chloride is the preferred compound. In the case of the most active forms of magnesium chloride, the X-ray spectrum of the catalyst component shows a halo instead of the reflection which in the spectrum of the nonactivated chloride appears at a distance of 2.56 Å.

The Al-alkyl compounds (b) used as co-catalysts comprise the Al-trialkyls, such as Al-triethyl, Al-isobutyl, Al-tri-n-butyl, and linear or cyclic Al-alkyl compounds containing two or more Al atoms bonded by way of O or N atoms, or $SO_4$ and $SO_3$ groups.

Examples of these compounds are:

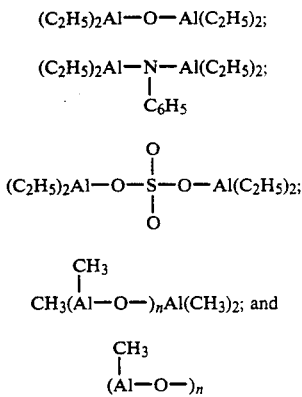

where n is a number from 1 to 20.

The Al-alkyl compound is generally used in such quantities that the Al/Ti ratio ranges from 1 to 1000. In addition to the solid catalyst component (a) and the Al-alkyl compound (b), the catalysts used in the process of the present invention comprise an external electron-donor compound (c) (i.e., an electron donor added to the Al-alkyl compound). Said external electron donor compound is selected from silanes capable of conferring to the catalyst the above mentioned levels of stereospecificity (determined by the high content of fraction insoluble in xylene at 25° C.) and sensitivity to the molecular weight regulator.

Suitable for this purpose are the silanes containing at least one cyclopentyl group bonded to the silicon, and one or more —OR groups also bonded to the silicon atom, where R is a $C_1$-$C_{18}$ alkyl, $C_3$-$C_{18}$ cycloalkyl, $C_6$-$C_{18}$ aryl, or $C_7$-$C_{18}$ aralkyl radical. Preferably R is methyl or ethyl. Particularly suited is the dicyclopentyl-dimethoxysilane (DCPMS). The above mentioned external donors are generally used in quantities ranging from 0.001 to 15 moles, preferably from 1 to 10 moles with respect to the moles of Al-alkyl compound (b).

Preferably, the process for preparing the broad molecular weight distribution propylene polymer material used in the present invention comprises polymerization of monomers in the presence of the above catalysts, where the polymerization occurs in at least two stages, preparing fraction (A) and (B) in separate and consecutive stages, and operating in each stage in the presence of the polymer and the catalyst coming from the preceding stage.

The polymerization process can be carried out in batch or in continuous mode, according to known techniques, operating in liquid phase in the presence or not of an inert diluent, or in gas phase, or liquid-gas phase, preferably gas phase.

Reaction times and temperatures are not critical, however, it is best if the temperature ranges from 20° C. to 100° C.

As previously stated the regulation of the molecular weight is done by using known regulators, particularly hydrogen.

The catalysts can be precontacted with small quantities of olefins (prepolymerization). Prepolymerization improves both catalyst activity and polymers' morphology.

The prepolymerization is carried out maintaining the catalyst in suspension in a hydrocarbon solid (hexane or heptane, for example), and the polymerization temperature is between ambient temperature and 60° C. for a period of time which is sufficient to produce a quantity of polymer ranging from 0.5 to 3 times the weight of the solid component. It can also be carried out in liquid propylene under the above indicated temperature conditions, and producing quantities of polymer that can reach 1000 g per g of catalyst component.

With respect to the thickness of the film materials according to the present invention, biaxially oriented film materials of conventional thickness and thin films less than 20 mils thick to as thin as about 0.1 mils can be prepared as well as heavy film materials, typically referred to as sheets, from 20 to 100 mils thick.

There is no particular limitation with respect to the method of producing the films or sheets of the present invention. They can be produced by utilizing any conventional coextrusion equipment and processing conditions.

Analytical Methods

Unless otherwise specified, the following analytical methods are used to characterize the polymer materials, films prepared therefrom and comparative films.

| Properties | Method |
| --- | --- |
| Moisture Vapor Transmission Rate, (MVTR) | ASTM-E 96 |
| Elongation @ break, (MD/CD), % | ASTM-D 638 |
| Tensile Str. @ break, (MD/CD), % | ASTM-D 638 |
| Tangent Modulus | ASTM 638 |
| Haze, % | ASTM-D 1003 |
| Melt Flow Rate (MFR) | ASTM-D 1238, condition L |
| Molecular Weight Distribution, (Mw/Mn) | Determined by Waters 150-C ALC/GPC, in trichlorobenzene at 145° C. with a differential |

-continued

| Properties | Method |
|---|---|
|  | refractive index detector. |

Control 1

A three layer film is coextruded and biaxially oriented, having a thickness of 20 um. The inner layer of the film is prepared from KF 6100, a propylene homopolymer having a MFR of 3-4, produced by Shell Chemical Company, and is 80% of the overall thickness of the film. The two surface layers on both sides of the inner layer each consist of the same propylene homopolymer used for the inner layer and each comprise 10% of the thickness of the film.

Control 2

A three layer film is coextruded and biaxially oriented, having a total thickness of 20 um. The inner layer of the film is 80% of the overall thickness of the film and is prepared from a propylene homopolymer having a Mw/Mn greater than 20 and a MFR of 3-5. The two surface layers on both sides each comprise 10% of the thickness of the film. The surface layers each consist of the same propylene homopolymer used for the inner layer.

EXAMPLE 1

A three layer film is coextruded and biaxially oriented, having a total thickness of 20 um. The inner layer of the film is the same KF 6100, propylene homopolymer used above in Control 1, and is 80% of the overall thickness of the film. The two surface layers on both sides each comprise 10% of the thickness of the film. The surface layers each consist of 10% of a propylene homopolymer having a Mw/Mn greater than 20, and a MFR of 3-5.

Set forth in Table 1 below, are the physical properties of the resulting films of Example 1 of the present invention and Controls 1 and 2.

TABLE 1

|  | Resins | | |
|---|---|---|---|
| Properties | Ex. 1 | Con. 1 | Con. 2 |
| Elongation @ Break, (MD/CD), % | 152/30 | 151/28 | 110/28 |
| Tensile Str. @ Break, (MD/CD), % | 24/36 | 26/40 | 21/36 |
| Tangent Modulus, (MD/CD), kpsi | 233/453 | 234/406 | 327/456 |
| Haze, % | 2.4 | 0.4 | 1.1 |
| MVTR, gm/100 in$^2$/24 hr. | 0.2 | 0.4 | 0.3 |

It can be seen from Table 1 that Example 1 of the present invention have improved stiffness and moisture barrier properties than the film of Controls 1 and 2.

Control 3

A three layer film is coextruded and biaxially oriented, having a thickness of 20 um. The inner layer of the film is prepared from KF 6100, a propylene homopolymer having a MFR of 3-4, and is 90% of the overall thickness of the film. The two surface layers on both sides of the inner layer each consist of the same polypropylene used for the inner layer, and each comprised 5% of the thickness of the film.

EXAMPLE 2

A three layer film is coextruded and biaxially oriented, having a total thickness of 20 um. The inner layer of the film is prepared from KF 6100, a propylene polymer having a MFR of 3-4, and is 90% of the overall thickness of the film. The two surface layers on both sides each comprise 5% of the thickness of the film. The surface layers each consist of a propylene homopolymer having a Mw/Mn greater than 20, and a MFR of 3-5.

EXAMPLE 3

A three layer film coextruded and biaxially oriented, as in Example 2, except that blend of the two surface layers consisted of 50% of the broad molecular weight distribution polypropylene and 50% of the propylene homopolymer and each surface layer comprised 5% of the thickness of the film.

In Table 1, the moisture vapor transmission property of the resulting films of Examples 3 and 4 of the present invention were compared with the polypropylene of Control 2.

TABLE 2

| Resin | Moisture Vapor Transmission Rate |
|---|---|
| Control 3 | 0.42 |
| Example 2 | 0.32 |
| Example 3 | 0.37 |

As seen from the above Table 2, the films of the present invention demonstrate about a 30% to 50% improvement in moisture vapor transmission over the film of Control 2, which contained only layers of propylene homopolymer.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A biaxially oriented film or sheet article comprising:
   (a) a film or sheet of a crystalline homopolymer of a $C_{3-10}$ alpha-olefin monomer or of a copolymer selected from the group consisting of (i) propylene with ethylene or $C_{4-10}$ alpha-olefin monomer, and (ii) propylene and two different olefins selected from the group consisting of ethylene and $C_{4-10}$ alpha-olefin; and
   (b) at least one layer of a broad molecular weight distribution propylene polymer material having a MWD of from 10 to 60, optionally containing from 90% to 30%, by weight, of a propylene homopolymer having an isotactic index greater than 80, or a copolymer selected from the group consisting of (i) propylene and ethylene, (ii) propylene and a $C_{4-10}$ alpha-olefin, having a maximum polymerized alpha-olefin content of about 20%, (iii) propylene and two different olefins selected from the group consisting of ethylene and $C_{4-8}$ alpha-olefins, provided that the maximum polymerized $C_{4-8}$ alpha-olefin content is about 20%, and when ethylene is one of the olefins, the maximum polymerized ethylene content is about 5%, with a maximum comonomer content of 25%; and (iv) a blend of from 30 to 65% of the copolymer defined in (ii), which contains from 80 to 98% propylene, with from 35 to 70% of the copolymer defined in (i) which contains from 7 to 9% ethylene, or of the terpolymer defined in (iii) having a total comonomer content of from 2 to 10%, and an ethylene content from 1 to 3%.

2. The article of claim 1, wherein (a) is a propylene homopolymer.

3. The article of claim 2, wherein (b) is a broad molecular weight distribution propylene polymer material having a MWD of 12 to 50.

4. The article of claim 1, wherein (a) is a copolymer.

5. The article of claim 4, wherein (b) is a broad molecular weight distribution propylene polymer material having a MWD of from 12 to 50.

6. The article of claim 2, wherein (b) is a blend of from 10% to 70%, by weight, of a broad molecular weight distribution propylene polymer material having a MWD of from 12 to 50, with from 90% to 30%, by weight, of a propylene homopolymer having an isotactic index greater than 80, or a copolymer selected from the group consisting of:
 (i) a random copolymer of propylene and ethylene having a maximum polymerized ethylene content of about 10%;
 (ii) propylene and a $C_{4-10}$ alpha-olefin, having a maximum polymerized alpha-olefin content of about 20%;
 (iii) propylene and two different olefins selected from the group consisting of ethylene and $C_{4-8}$ alpha-olefins, provided that the maximum polymerized $C_{4-8}$ alpha-olefin content is about 20%, and when ethylene is one of the olefins, the maximum polymerized ethylene content is about 5%, with a maximum comonomer content of 25%; and
 (iv) a blend of from 30 to 65% of the copolymer defined in (ii), which contains from 80 to 98% propylene, with from 35 to 70% of the copolymer defined in (i) which contains from 7 to 9% ethylene, or of the terpolymer defined in (iii) having a total comonomer content of from 2 to 10%, and an ethylene content from 1 to 3%.

7. The article of claim 6, wherein said blend is 10%, by weight, of a broad molecular weight distribution propylene polymer material having a MWD of from 20 to 25, with 90%, by weight, of a propylene homopolymer having an isotactic index of greater than 80.

8. The article of claim 4, wherein (b) is a blend of 10% to 70%, by weight, of a broad molecular weight distribution propylene polymer material having a MWD of from 12 to 50, with 90% to 30%, by weight, of a propylene homopolymer having an isotactic index greater than 80, or a copolymer selected from the group consisting of:
 (i) a random copolymer of propylene and ethylene having a maximum polymerized ethylene content of about 10%;
 (ii) a random copolymer of propylene and a $C_{4-10}$ alpha-olefin, having a maximum polymerized alpha-olefin content of about 20%;
 (iii) a random terpolymer of propylene and two different olefins selected from the group consisting of ethylene and $C_{4-8}$ alpha-olefins, provided that the maximum polymerized $C_{4-8}$ alpha-olefin content is about 20%, and when ethylene is one of the olefins, the maximum polymerized ethylene content is about 5%, with a maximum comonomer content of 25%; and
 (iv) a blend of from 30 to 65% of the copolymer defined in (ii), which contains from 80 to 98% propylene, with from 35 to 70% of the copolymer defined in (i) which contains from 7 to 9% ethylene, or of the terpolymer defined in (iii) having a total comonomer content of from 2 to 10%, and an ethylene content from 1 to 3%.

9. The article of claim 8, wherein said blend is 10%, by weight of a broad molecular weight distribution propylene polymer material having a MWD of from 20 to 25, with a propylene homopolymer having an isotactic index of greater than 80.

10. The article of claim 1, further comprising a second surface layer consisting of a broad molecular weight distribution propylene polymer material having a MWD of from 10 to 60, optionally containing from 90% to 30%, by weight, of a propylene homopolymer having an isotactic index greater than 80, or a copolymer selected from the group consisting of:
 (i) a random copolymer of propylene and ethylene having a maximum polymerized ethylene content of about 10%;
 (ii) a random copolymer of propylene and a $C_{4-10}$ alpha-olefin, having a maximum polymerized alpha-olefin content of about 20%;
 (iii) a random terpolymer of propylene and two different olefins selected from the group consisting of ethylene and $C_{4-8}$ alpha-olefins, provided that the maximum polymerized $C_{4-8}$ alpha-olefin content is about 20%, and when ethylene is one of the olefins, the maximum polymerized ethylene content is about 5%, with a maximum comonomer content of 25%; and
 (iv) a blend of from 30 to 65% of the copolymer defined in (ii), which contains from 80 to 98% propylene, with from 35 to 70% of the copolymer defined in (i) which contains from 7 to 9% ethylene, or of the terpolymer defined in (iii) having a total comonomer content of from 2 to 10%, and an ethylene content from 1 to 3%.

11. The article of claim 10, wherein the second surface layer is a broad molecular weight distribution propylene polymer material having a MWD of from 12 to 50.

12. The article of claim 10, wherein the second surface layer is a blend of 10% to 70%, by weight, of a broad molecular weight distribution propylene polymer material having a MWD of from 12 to 50, with 90% to 30%, by weight, of a propylene homopolymer having an isotactic index greater than 80, or a copolymer selected from the group consisting of:
 (i) a random copolymer of propylene and ethylene having a maximum polymerized ethylene content of about 10%;
 (ii) a random copolymer of propylene and a $C_{4-10}$ alpha-olefin having a maximum polymerized alpha-olefin content of about 20%;
 (iii) propylene and two different olefins selected from the group consisting of ethylene and $C_{4-8}$ alpha-olefins, provided that the maximum polymerized $C_{4-8}$ alpha-olefin content is about 20%, and when ethylene is one of the olefins, the maximum polymerized ethylene content is about 5%, with a maximum comonomer content of 25%; and (iv) a blend of from 30 to 65% of the copolymer defined in (ii), which contains from 80 to 98% propylene, with from 35 to 70% of the copolymer defined in (i) which contains from 7 to 9% ethylene, or of the terpolymer defined in (iii) having a total comonomer content of from 2 to 10%, and an ethylene content from 1 to 3%.

13. The article of claim 12, wherein said blend is 10% to 50%, by weight, of a broad molecular weight distribution propylene polymer material having a MWD of from 20 to 25, with 90% to 50%, by weight, of a propylene homopolymer having an isotactic index of greater than 80.

* * * * *